May 1, 1934.  C H. DAVIS  1,957,133
CAKE GRIDDLE
Filed March 28, 1933
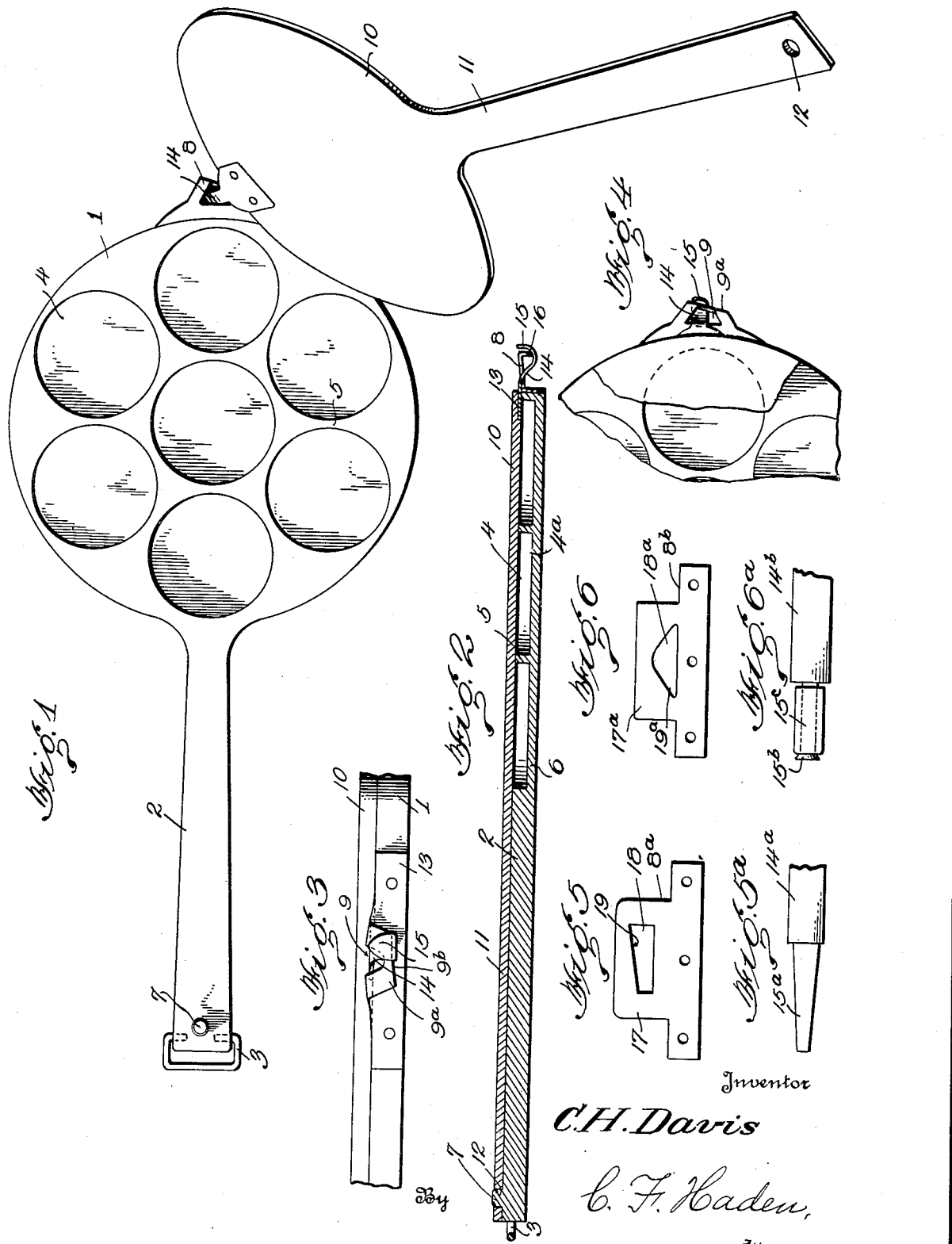
Inventor
C. H. Davis
By C. F. Haden,
Attorney Patented May 1, 1934

1,957,133

UNITED STATES PATENT OFFICE 1,957,133

CAKE GRIDDLE

Charles H. Davis, Manchester, Maine

Application March 28, 1933, Serial No. 663,205

8 Claims. (Cl. 53—10)

This invention relates to cooking utensils and more particularly to griddles for frying batter cakes or flap jacks.

A primary object of the invention is to so construct a griddle of this character that the cakes produced thereby will be of uniform size and thickness and browned on each side to the same degree thus avoiding serving cakes scorched on one side and undercooked on the other.

Another object of the invention is to construct a griddle so that the cakes produced thereon will be held out of contact with each other and retained in separate distinct units.

Another object is to provide a griddle constructed so that a plurality or group of cakes of uniform size and thickness may be simultaneously cooked and turned in a single operation and kept in the form of separate units ready to be served individually.

Still another object is to form a two-part griddle of this character the body and cover members of which are so constructed that while being separably connected yet when the cover is superposed on the griddle a tight fit between the cooperating faces is ensured.

Another object is to provide a two-part griddle the connection between the members of which is so constructed that said members may be quickly and easily connected and disconnected for use jointly to turn all of the cakes at the same time and singly to permit one member to complete the cooking of the cakes so turned while the other member may be refilled with batter to form another batch of cakes and thus provide for a continuous performance to ensure the serving of hot cakes which are of uniform size, thickness and cooked the same on both sides.

In carrying out these objects the invention is susceptible of modifications without departing from the spirit or sacrificing any of the advantages of the claimed invention.

In the accompanying drawings

Figure 1 represents a plan view of the body member of the griddle embodying this invention with the top shown in perspective and in the position assumed while being connected;

Fig. 2 is a longitudinal section through the griddle with the members connected and in closed position;

Fig. 3 is a detail front elevation of the form of hinge shown in Figs. 1 and 2, with the members connected;

Fig. 4 is a detail plan view of the hinge and adjacent parts shown in Figs. 1, 2 and 3;

Fig. 5 is a front view of the body-carried member of another form of hinge;

Fig. 5a is a similar view of the complementary or top-carried member;

Fig. 6 is a view similar to Fig. 5 of still another form of hinge; and

Fig. 6a is a similar view of the member complementary to that shown in Fig. 6.

In the embodiment illustrated the griddle constituting this invention comprises a body member 1 of any desired shape being here shown circular and which may be of any desired size and thickness and constructed of any suitable metal, such as aluminum pressed steel or cast iron. A handle 2 extends radially from one edge of this body member and is equipped at its free end with a catch member 3. The body 1 has its inner or upper face made flat or plane thruout and provided with a plurality of batter receiving molds or cups 4 any desired number of which may be formed, seven being here shown. The molds are separated one from the other by walls or partitions 5 so that their contents will be kept separate and distinct.

A cover member 10 of a size and shape to conform to that of the body 1 has a handle 11 radiating from one edge which is adapted to overlie the handle 2 of the member 1 when the parts are in cooperative assembled relation. The outer end of the handle 11 is designed to be engaged by the catch member 3 of the handle 2 to hold the parts together and prevent accidental separation during their cooperative use. These handles are also provided with registering apertures 7 and 12 to provide for the utensil being hung on a nail or hook when not in use.

The inner face of the cover member 10 is made flat and smooth thruout so that when placed over the molds 4 of the body member the faces of these members will lie flat in close proximity as shown clearly in Fig. 2 and thus prevent all possibility of the batter in the molds 4 from flowing out over the surface of the griddle and ensuring the cakes being retained as separate units in their respective molds, thereby avoiding contact with each other and consequent marring of their shapes.

A hinge member 8, preferably resilient, carried by the body 1 at a point opposite the handle 2 cooperates with a complementary hinge member 13, also preferably resilient, on the cover 10, to detachably connect the cover with the body and ensure a tight connection between the parts. Member 8 shown in detail in Fig. 4, is made in the form of a radially extending substantially triangular plate having an opening 9. The apex or point 9ª of this plate extends laterally outward or toward the bottom of member 1 and is truncated at its terminal as shown at 9ᵇ, the cut off portion being along an incline for a purpose to be described.

The hinge member 13 of the cover 10 extends radially from the cover at a point opposite its handle 11 and has a hook-like tongue 14 bent laterally toward the inner or cake-receiving face of the cover. This hook-shaped tongue has its bill 15 slightly twisted and is designed to be inserted thru the opening 9 of member 1 when the parts are to be connected. When this tongue is so inserted and the cover is swung into closed position the inclined edge 9ᵇ of the truncated terminal of hinge member 8 bitingly engages the tongue bill as shown at 16 and forms a cam lock whereby when the parts are in closed position and the handles connected as shown in Fig. 2 the inner faces of the two members 1 and 10 will closely engage and permit the cakes to be transferred from body member 1 to cover 10 without spreading or changing their shape thus forming a cake the edges of which are of the same thickness as the body portion of the cake.

From Fig. 2 it will be seen that the bottoms or heat impinging walls 4ª of the batter cups or molds 4 are of the same thickness as the thickness of cover 10, for the purpose of ensuring the cakes being evenly browned on both sides when they are subjected to the same degree of heat for the same length of time. This provides for the systematic cooking of the cakes as will be described.

In Figs. 5 and 5a a slightly different form of hinge is shown for connecting the parts of the griddle the body-carried member being in the form of an upstanding plate 8ª having an opening 18 to receive the hinge member 14ª of the cover. The upper wall 19 of this opening has a cam-edge 19 to engage a pin 15ª of the cover carried member 14ª so that the top and body members will be tightly held together when closed.

In Figs. 6 and 6a another form of hinge is shown the body-carried member 8ᵇ of which has an upstanding plate 17ª with a triangular opening 18ª the inclined or cam walls 19ª of which are designed to bitingly engage a roller 15ᶜ carried by a pin 15ᵇ of the cover member 14ᵇ.

These various hinge members may be formed integrally with the body and cover parts of the griddle, or they may be formed separately and attached thereto in any preferred and efficient manner.

In the use of this griddle the body 1 having been heated to the proper degree, the batter to form the cakes is placed in the molds 4 and subjected to the necessary heat the time required to brown the cakes on their lower faces. While this is being done the cover is heated to the required degree and when the tongue 14 is inserted thru the opening 9 in the body hinge member 8 and the cover swung over member 1 into closed position shown in Fig. 2, the bill 15 of the tongue is bitingly engaged with the cam edge of the truncated terminal of hinge member 8 and forms a lock between the two members holding them securely together and preventing wabbling. The handles of the members 1 and 10, which are preferably formed of or provided with heat insulating material, may be grasped and held together by the hand of the cook during the turning operation, but are preferably held against slippage by a catch 3 such as that shown in the drawing. When the parts are so placed the griddle is turned over and the body member 1 quickly and easily disengaged from the cover by swinging it upward and outward causing the hinge member 8 to slide freely out from under tongue 14. The cakes are then left on the heated cover the time necessary to brown them and while this is being done the cups 4 may be filled with another batch which will be ready to be turned out on the cover by the time the first batch is cooked. Thus a continuous performance may be carried on to quickly and continuously supply hot cakes fresh from the griddle of uniform size and thickness evenly browned on both sides. The supplying of cakes of this character is especially desirable in restaurants, hotels and the like and they are also attractive for the home table.

I claim as my invention:

1. A cake griddle composed of two parts connected by hinge elements of resilient material to prevent breaking the hinge by cake dough on the face of the griddle when the two parts of the griddle are brought into parallelism, one part provided with cake-receiving recesses, the other part plane surfaced, the bottoms of the recesses in one part and the body of the other part both composed of metal of the same thickness whereby when the two parts are equally heated the same amount of baking heat may be applied to both top and bottom of the cakes to insure even browning.

2. A cake griddle composed of two parts connected by separable hinge elements of resilient material to prevent breaking the hinge by cake dough on the face of the griddle when the two parts of the griddle are brought into parallelism, one part having cake-receiving recesses, the other part plane surfaced and of uniform thickness thruout, the bottoms of the cake-receiving recesses being of the same thickness as the thickness of the other part whereby when the two parts are equally heated the same amount of baking heat may be applied to both sides of the cakes.

3. The combination in a cake griddle of two cooperating parts, hinge elements on both parts, the hinge element on one part being provided with an opening having on the metal defining the opening a cam surface, the hinge element of the other part having a tongue for entering the opening in the first named hinge element and engaging the cam surface whereby when the two hinge elements are engaged and the two parts of the griddle brought into substantial parallelism the tongue member and cam will lockingly hold the parts in close contact.

4. The combination in a cake griddle of two co-operating parts, hinge elements on both parts, the hinge element on one part being provided with an opening having on the metal defining the opening a bearing surface inclined to the plane of the body of the part, the hinge element of the other part having a hook member for entering the opening in the first named hinge element and engaging with the inclined surface whereby when the two hinge elements are engaged and the two parts of the griddle brought into substantial parallelism the hook member riding along the inclined surface will clampingly connect the two parts.

5. A cake griddle composed of two separably connected parts, one part having cake receiving recesses and the other part plane surfaced, a hinge element on one part provided with an opening having a cam on one wall thereof, a hinge element on the other part having a tongue to enter said opening and engage the cam wall thereof when the parts are arranged in superposed operative position whereby the meeting faces of the parts are securely held in contact.

6. The combination in a cake griddle of two co-operating parts, hinge elements on both parts, the hinge element on one part having an opening and one end bent laterally and extended under said opening, said bent end being inclined to form a cam, the hinge element of the other part being in the form of a tongue having a bill to enter said opening of the other hinge element and to engage the cam of said element when the parts are arranged in superposed operative position whereby the meeting faces of the parts are firmly held in close contact.

7. The combination in a cake griddle of two co-operating parts, hinge elements on both parts, the hinge element on one part having an opening with a cam on one wall thereof, the hinge element of the other part comprising a tapered pin to enter said opening of the other hinge element and to engage the cam of said element when the parts are arranged in superposed operative position to tightly hold the meeting faces of the parts in close contact.

8. The combination in a cake griddle of two cooperating parts, hinge elements on both parts, the hinge element on one part having an opening with a cam on one wall thereof, the hinge element of the other part having a roller to enter the opening of the other hinge element and engage the cam thereof when the parts are arranged in superposed operative position to tightly hold the meeting faces of the parts in close contact.

CHARLES H. DAVIS.